United States Patent [19]

Syouzi et al.

[11] Patent Number: 5,271,915
[45] Date of Patent: Dec. 21, 1993

[54] METHOD FOR PROCESSING NITROGEN OXIDE GAS

[75] Inventors: Fukuzi Syouzi, Gunma; Yuji Ishizaka, Kanagawa; Masanori Haba, Chiba; Yoshihiko Asano, Tokyo; Shigeru Yamashita, Tokyo; Yoshito Syougi, Kanagawa, all of Japan

[73] Assignee: Kabushiki Kaisha Meidensha, Tokyo, Japan

[21] Appl. No.: 768,212

[22] PCT Filed: May 31, 1990

[86] PCT No.: PCT/JP90/00709
§ 371 Date: Oct. 7, 1991
§ 102(e) Date: Oct. 7, 1991

[87] PCT Pub. No.: WO91/12070
PCT Pub. Date: Aug. 22, 1991

[30] Foreign Application Priority Data

| Feb. 8, 1990 | [JP] | Japan | 2-29255 |
| Mar. 19, 1990 | [JP] | Japan | 2-68905 |
| Mar. 19, 1990 | [JP] | Japan | 2-68906 |
| Mar. 19, 1990 | [JP] | Japan | 2-68907 |
| Mar. 19, 1990 | [JP] | Japan | 2-68908 |
| Mar. 19, 1990 | [JP] | Japan | 2-68909 |

[51] Int. Cl.$^5$ ............ C01B 21/00; B01J 8/00
[52] U.S. Cl. .................... 423/235; 423/239
[58] Field of Search .......... 423/235, 235 D, 239, 423/239 A

[56] References Cited

U.S. PATENT DOCUMENTS 5,020,457  6/1991  Mathur et al. ............ 423/235
5,192,516  3/1993  Correa ........................ 423/235

FOREIGN PATENT DOCUMENTS 2847184  11/1984  Australia.
0145517   6/1985  European Pat. Off..
3609763   9/1987  Fed. Rep. of Germany.
2177687   1/1987  United Kingdom.
84020691  1/1987  World Int. Prop. O..

OTHER PUBLICATIONS

Greenwood N. N. & Earnshaw A.-Chemie der Elemente (Translation of Chemistry of the Elements, Pergamon 1984)-De, Weinheim, VCH Verlagsgesellschaft, 1988-1707 blz.: DE, pp. 553-554.

Primary Examiner—Gregory A. Heller
Attorney, Agent, or Firm—Bachman & LaPointe

[57] ABSTRACT

In a method for processing nitrogen oxide, nitrogen oxide is reacted with hydrogen azide. Oxygen and/or plasma is utilized to accelerate the reaction between nitrogen oxide and hydrogen azide. An apparatus for use in performing the nitrogen oxide processing method includes a reaction case in which an aqueous solution containing hydrogen azide is provided. Nitrogen oxide containing gas is introduced into the reaction case for reacting nitrogen oxide with hydrogen azide to reduce nitrogen oxide. A plasma generating unit may be provided for feeding plasma into the nitrogen oxide contained gas.

17 Claims, 7 Drawing Sheets

METHOD FOR PROCESSING NITROGEN OXIDE GAS

DESCRIPTION

1. Technical Field

The present invention relates generally to a method and an apparatus for processing nitrogen oxide gas ($NO_x$ gas) More specifically, the present invention relates to a method of reducing $NO_x$ gas contained in exhaust gases discharged from, such as, a diesel engine, a gasoline engine, a gas-turbine engine and other burning fuel systems, such as, a thermoelectric generator, and to an apparatus to be used for performing such a method.

2. Background Art

A $NO_x$ gas reduction processing is known, for example, as a flue gas denitration technique which has been brought into practice. The flue gas denitration technique is roughly classified into a dry process and a wet process In general, the most advanced technique is a selective contact reduction method of the dry process which has the following advantages:

(1) A high denitration rate can be attained.

(2) The $NO_x$ gas is reduced and decomposed into nitrogen ($N_2$) and water ($H_2O$) which are both harmless to human beings. Accordingly, no further processing unit is necessary for further processing the decomposed components before exhausting processed flue gas.

The selective contact reduction method typically utilizes ammonia gas ($NH_3$), hydrocarbon, or carbon monoxide (CO) as a reducing agent. Since ammonia selectively reacts with $NO_x$ even in the presence of oxygen ($O_2$) while the other two reducing agents react solely with oxygen, the ammonia gas is generally utilized particularly in case of reducing the $NO_x$ gas contained in the exhaust gas discharged from the diesel, gasoline or gas-turbine engine or the like.

In the above-noted selective contact reduction method, noble metals, such as, platinum or various metallic oxides carried by, such as, aluminum oxide ($Al_2O_3$) and titanium dioxide $TiO_2$, are respectively used as a catalyst in the reaction between the $NO_x$ gas and the ammonia gas. Since most of the $NO_x$ gas contained in the exhaust gas is nitrogen monoxide (NO) gas with only about 5% of $NO_2$ gas, the main reaction generated in the selective contact reduction method is represented by the following formula, wherein the NO gas is reacted with the ammonia gas on the catalyst so that the NO gas is reduced and decomposed to $N_2$ and $H_2O$:

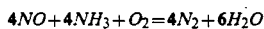

$$4NO + 4NH_3 + O_2 = 4N_2 + 6H_2O$$

However, the above-noted selective contact reduction method has the following problems (1) Ammonia gas which is used for decomposing $NO_x$ is, as is well known, highly toxic and corrosive, and very dangerous to handle.

(2) Capability of the catalyst tends to be degraded with use due to contact with applied ammonia gas as well as with various components contained in the exhaust gas Accordingly, it is required to change the catalyst relatively in a short term, which is troublesome.

(3) The range of working temperature is limited. Specifically, at a high temperature of about 450° C., sintering of the catalyst which follows phase transition in the catalyst is advanced to an undesired degree so that the catalyst is degraded. On the other hand, at a temperature less than about 320° C., ammonia gas and water content react with sulfur oxide ($SO_x$) contained in the exhaust gas to generate some compounds, such as, ammonium sulfate (($NH_4)_2SO_4$) so as to lower the denitration efficiency. Accordingly, in the above-noted selective contact reduction method, the range of working temperature is generally limited to that of 320° to 450° C. In practice, denitration below 320° C. is commonly required, in particular for a co-generation system.

(4) The entire system inevitably becomes large as the catalyst requires a large surface to contact reactants. A ample space is required to handle large volumes of dangerous ammonia gas to match $NO_x$ volume.

DISCLOSURE OF INVENTION

Therefore, it is an object of the present invention to provide a method of processing nitrogen oxide gas that can eliminate the above-noted defects inherent in the background art.

It is another object of the present invention to provide a method of processing nitrogen oxide gas that can reduce and decompose nitrogen oxide without using ammonia gas which is dangerous to handle.

It is still another object of the present invention to provide a method of processing nitrogen oxide gas that can reduce and decompose nitrogen oxide at an ordinary or room temperature.

It is a further object of the present invention to provide an apparatus for processing nitrogen oxide that can eliminate the above-noted defects inherent in the background art.

It is a still further object of the present invention to provide an apparatus for processing nitrogen oxide gas that can be small in size and simple in structure, and still can effectively reduce and decompose the nitrogen oxide gas.

To accomplish the above mentioned and other objects, according to the present invention, nitrogen oxide to be reduced is reacted with hydrogen azide. Oxygen and/or plasma is utilized to accelerate the reaction between nitrogen oxide and hydrogen azide.

According to one aspect of the present invention, a method for processing nitrogen oxide, comprising the steps of:

forming an aqueous solution containing hydrogen azide;

forming a gas mixture of nitrogen oxide containing gas and oxygen and air;

introducing the gas mixture into the aqueous solution for reacting the nitrogen oxide with the hydrogen azide to reduce the nitrogen oxide.

According to another aspect of the present invention, a method for processing nitrogen oxide, comprising the steps of:

forming an aqueous solution containing hydrogen azide;

introducing nitrogen oxide containing gas into the aqueous solution to form a gas mixture with a mist of said aqueous solution;

feeding plasma into said gas mixture with mist of said aqueous solution for accelerating reaction between the nitrogen oxide and the hydrogen azide to reduce the nitrogen oxide.

According to a further aspect of the present invention, an apparatus for processing nitrogen oxide, comprising:

reaction casing means;

first means for providing an aqueous solution containing hydrogen azide in the reaction casing means;

second means for introducing nitrogen oxide containing gas into the reaction casing means so as to react the nitrogen oxide with the hydrogen azide in the reaction casing means to reduce the nitrogen oxide;

third means for discharging the reduced nitrogen oxide out of the reaction casing means. According to a still further aspect of the present invention, an apparatus for processing nitrogen oxide, comprising:

a first reaction case having a bottom;

closure means for closing an upper end of the first reaction case;

a conduit extending into the first reaction case through the closure means, the conduit having first outlet means for providing an aqueous solution containing hydrogen azide in the first reaction case and for introducing nitrogen oxide containing gas into the aqueous solution in the first reaction case so as to react the nitrogen oxide with the hydrogen azide to reduce the nitrogen oxide, the conduit being rotatable;

a second reaction case fixedly provided between the first reaction case and the conduit for providing a first space between the conduit and the second reaction case and a second space between the second reaction case and the first reaction case, the second reaction case having second outlet means for establishing communication between the first and second space;

a helical vane fixed to an outer periphery of the conduit at its lower portion, the helical vane being co-rotatable with the conduit for giving swirl to the aqueous solution in the first space;

outlet means for communicating the second space with outside of the first reaction case so as to exhaust the reduced nitrogen oxide to the outside.

BRIEF DESCRIPTION OF DRAWINGS

The present invention will be understood more fully from the detailed description given hereinbelow and from the accompanying drawings of the preferred embodiment of the invention, which are given by way of example only, and are not intended to be limitative of the present invention.

In the drawings

FIGS. 4 and 4A are schematic views showing a modification of the apparatus of FIG. 3;

PREFERRED EMBODIMENT

Now, preferred embodiments of the present invention will be described hereinbelow.

All through the preferred embodiments, main reactions for reducing and decomposing $NO_x$ gas to nitrogen ($N_2$) and water ($H_2O$) are represented by the following reaction formulae:

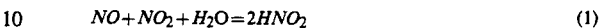

$$NO + NO_2 + H_2O = 2HNO_2 \tag{1}$$

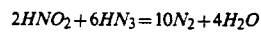

$$2HNO_2 + 6HN_3 = 10N_2 + 4H_2O$$

This shows that the $NO_x$ gas is reduced and decomposed to $N_2$ and $H_2O$ without using the ammonia gas which is dangerous to handle.

In general, the absorption of gas into liquid is not advanced efficiently. The reaction formula (1) shows the absorption of the $NO_x$ gas into $H_2O$ so as to react $NO_x$ with $H_2O$ to obtain nitrous acid ($HNO_2$), which is the so-called rate-determining stage controlling the entire reaction rate Accordingly, if the high reaction rate of the reaction formula (1) is attained, the subsequent reaction represented by the reaction formula (2) is easily promoted. Based on the reaction formula (2), nitrous acid ($HNO_2$) is reacted with hydrogen azide ($HN_3$) to provide nitrogen ($N_2$) and water ($H_2O$) both of which are harmless to the human body. Generally, nitrogen ($N_2$) is discharged into the atmosphere as processed gas without being further processed.

In order to accelerate the reaction represented by the reaction formula (1), the preferred embodiments employ oxygen as a reaction accelerator and/or plasma which is generated by applying electric energy to the $NO_x$ gas for activating same to accelerate the reaction represented by the reaction formula (1). A separate source of oxygen or air can also be used. Naturally, if a higher reaction rate is required, oxygen concentration should also be higher.

Figure 1:
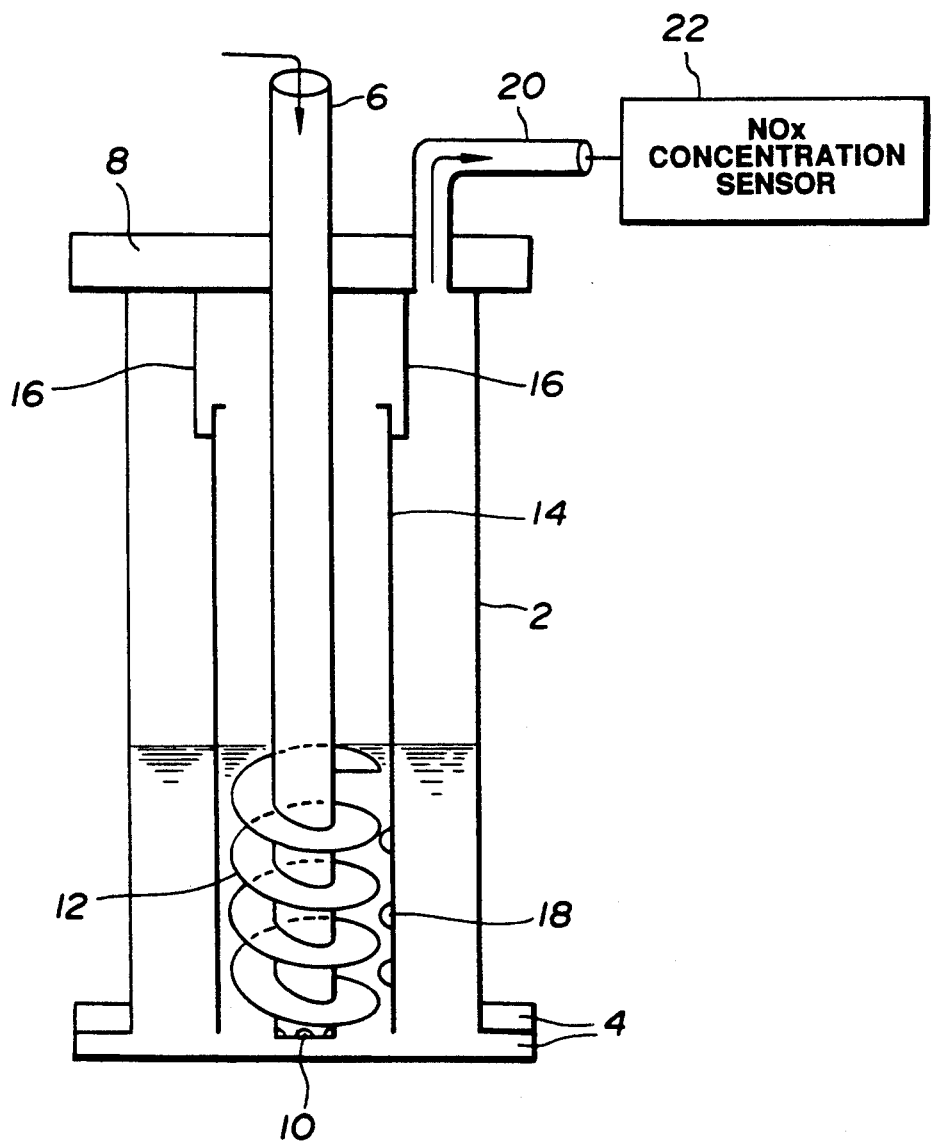
FIG. 1 is a schematic view showing an apparatus for processing nitrogen oxide, to be used in first and second preferred embodiments of the present invention.

FIG. 1 shows an apparatus for processing the $NO_x$ gas so as to decompose $NO_x$ to $N_2$ and $H_2O$, to be used in a first preferred embodiment of the present invention.

In the first preferred embodiment, the reduction of $NO_x$ is resulted by introducing a mixture of the $NO_x$ gas and one of oxygen and air into an aqueous solution including hydrogen azide ($HN_3$). The above-noted aqueous solution is obtained by dissolving azide or an azide compound in water under acid conditions. Various kinds of azides or azide compounds can be used to provide the above-noted aqueous solution as long as they can be dissolved in water under acid conditions to form hydrogen azide, such as, a compound formed from $N_3^-$ ion and one selected from the group consisting of nitrogen trioxide ($NO_3$), carbon monoxide (CO), iodine (I) and metals which belong to the 3rd to 6th periods of the groups 1A and 2A in the periodic table. For example, sodium azide ($NaN_3$), potassium azide ($KN_3$), cadmium azide ($Cd(N_3)_2$), calcium azide ($Ca(N_3)_2$), strontium azide ($Sr(N_3)_2$), barium azide ($Ba(N_3)_2$) and ammonium azide ($NH_4N_3$) are preferable. It is to be appreciated that these azides can be used alone or in combination with one or more of the other azides.

Further, in order to dissolve azide in the acid aqueous solution to form hydrogen azide, various kinds of acids can be employed, such as, hydrochloric acid (HCl), sulfuric acid ($H_2SO_4$) and nitric acid ($HNO_3$) as long as it can react with the above-noted azide to form hydrogen azide ($HN_3$). It is to be appreciated that these acids can be used alone or in combination with one or more of the other acids. As an example, the following is a reaction formula for forming hydrogen azide from sodium azide and hydrochloric acid:

$$6NaN_3 + 6HCl = 6HN_3 + 6NaCl \tag{3}$$

It is to be appreciated that the pH of the acid aqueous solution for dissolving azide is preferably set less than 3. This is because, when the pH exceeds 3 in value, the dissociation of azide is not completely advanced so that the reaction represented by the reaction formula (3) is also not completely advanced, resulting in less amount of reaction between nitrous acid ($HNO_2$) and hydrogen azide ($HN_3$) represented by the reaction formula (2). Accordingly, in order to ensure the effective dissociation of azide in the acid aqueous solution, it is preferable to set the acidity less than pH 3. In FIG. 1, a reaction case 2 is generally of a cylindrical shape having a flanged portion 4 at its bottom, and is made of a metal, such as, a stainless steel for receiving the azide containing acid aqueous solution. A conduit 6 extends into the reaction case 2 through an upper closure 8 in airtight relationship therebetween and terminates just above a bottom of the reaction case 2. At a bottom of the conduit 6, a plurality of outlets 10 are formed. Further, a helical vane 12 is fixed to the conduit 6 at its lower portion. The conduit 6 is designed to rotate along with the helical vane 12 by means of a driving unit (not shown). In between the reaction case 2 and the conduit 6, an auxiliary reaction case 14 is provided. The case 14 is supported by a support member 16 at its upper portion to fix it in the reaction case 2. The support member 16 is fixed to the upper closure 8. A lower end of the auxiliary reaction case 14 is positioned just above the bottom of the reaction case 2. Further, a plurality of outlets 18 are formed through a peripheral wall of the auxiliary reaction case 14 at its lower portion corresponding to a position of the helical vane 12.

The azide containing acid aqueous solution is first introduced into the reaction case 2 through the conduit 6 for advancing the reaction of the reaction formula (3) before the gas mixture of $NO_x$ and oxygen and air is introduced thereinto. Subsequently, the gas mixture is introduced into the reaction case 2 through the conduit 6 and the outlets 10. In order to promote the reactions represented by the reaction formulae (1) and (2), the helical vane 12 is rotated to agitate or give swirl to the aqueous solution containing hydrogen azide and the introduced gas mixture for allowing the gas mixture to go up along the helical vane 12 to fully contact with the aqueous solution, so that the reactions of the reaction formulae (1) and (2) are accelerated. The nitrogen gas ($N_2$ gas) produced by the reaction formula (2) is then discharged through an exhaust conduit 20. Concentration of $NO_x$ contained in the processed gas is measured by a $NO_x$ concentration measuring apparatus 22.

The followings are examples performed according to the first embodiment of the present invention:

EXAMPLE 1

At first, 2 g of $NaN_3$ was dissolved in 200 millimeters of water, and a few drops of 30 wt % HCl were added solution to provide the pH less than 3. Subsequently, this solution was introduced into the reaction case 2 through the conduit 6.

Subsequently, a gas mixture of 3 liters per minute of exhaust gas containing 920 p.p.m. of $NO_x$ and 3 liters per minute of air was introduced into the solution so as to react the gas mixture with $NaN_3$. Subsequently, the produced gas was measured by the $NO_x$ concentration measuring apparatus 22 (Shimazu Portable $NO_x$ Measuring Apparatus NOA-305 Type).

TABLE 1 shows results of this measurement. As shown in TABLE 1, the exhaust gas including 920 p.p.m. of $NO_x$ was diluted by mixing with air to show 400 p.p.m. of $NO_x$. Further, $NO_x$ concentration was decreased to 50 p.p.m. by reacting the gas mixture including 400 p.p.m. of $NO_x$ with the $NaN_3$ solution.

TABLE 1

| CONDITION | $NO_x$ CONCENTRATION (p.p.m.) BEFORE PROCESSING | $NO_x$ CONCENTRATION (p.p.m.) AFTER PROCESSING |
|---|---|---|
| NOT TREATED | 920 | — |
| AIR | 920 | 400 |
| $NaN_3/H_2O$ + HCl | 400 | 50 |

EXAMPLE 2

In EXAMPLE 2, oxygen was used in place of air. The other conditions were the same as those of EXAMPLE 1.

TABLE 2 shows results of measurement performed by the same $NO_x$ measuring apparatus 22 as in EXAMPLE 1. As shown in TABLE 2, the exhaust gas including 920 p.p.m. of $NO_x$ was diluted by mixing with oxygen to show p.p.m. of $NO_x$. Further, $NO_x$ concentration was decreased to 25 p.p.m. by reacting the gas mixture including 400 p.p.m. of $NO_x$ with the $NaN_3$ solution. This clearly shows that by using oxygen in place of air, $NO_x$ concentration was further decreased to a half of that obtained in EXAMPLE 1.

TABLE 2

| CONDITION | $NO_x$ CONCENTRATION (p.p.m.) BEFORE PROCESSING | $NO_x$ CONCENTRATION (p.p.m.) AFTER PROCESSING |
|---|---|---|
| NOT TREATED | 920 | — |
| OXYGEN | 920 | 400 |
| $NaN_3/H_2O$ + HCl | 400 | 25 |

EXAMPLE 3

At first, 6.5 g of $NaN_3$ was dissolved in 1000 millimeters of water, and a few drops of $H_2SO_4$ were added to the solution to provide the pH less than 3. Subsequently, this solution was introduced into the reaction case 2 through the conduit 6.

Subsequently, exhaust gas containing 1000 p p m. of $NO_x$ was mixed with air so as to dilute the exhaust gas to form a gas mixture containing 500 p.p.m. of $NO_x$. This gas mixture was introduced into the solution so as to react the mixture gas with $NaN_3$.

Subsequently, the produced gas was measured by the same $NO_x$ concentration measuring apparatus 22 as in EXAMPLE 1.

TABLE 3 shows results of this measurement. As shown in TABLE 3, the diluted $NO_x$ concentration of 500 p.p.m. was decreased to 10 p.p.m. by reacting the gas mixture with the $NaN_3$ solution including $H_2SO_4$.

On the other hand, when the gas mixture was reacted with the $NaN_3$ solution with no $H_2SO_4$ included under the other conditions being the same, $NO_x$ concentration was decreased to only 400 p.p.m., which is also seen from TABLE 3.

TABLE 3

| CONDITION | $NO_x$ CONCENTRATION (p.p.m.) BEFORE PROCESSING | $NO_x$ CONCENTRATION (p.p.m.) AFTER PROCESSING |
|---|---|---|
| NOT TREATED | 1000 | — |
| AIR | 1000 | 500 |
| $NaN_3/H_2O$ | 500 | 400 |
| $NaN_3/H_2O$ + $H_2SO_4$ | 500 | 10 |

EXAMPLE 4

In EXAMPLE 4, HCl, $HNO_3$ or $C_2H_4O_2$ was used in place of $H_2SO_4$. The other conditions are the same as those of EXAMPLE 3.

TABLE 4 shows results of measurement performed by the same $NO_x$ concentration measuring apparatus 22 as in EXAMPLE 3. As shown in TABLE 4, $NO_x$ concentration was also largely decreased when utilizing HCl, $HNO_3$ or $C_2H_4O_2$.

TABLE 4

| KIND OF ACID | $NO_x$ CONCENTRATION (p.p.m.) AFTER PROCESSING |
|---|---|
| HCl | 50 |
| $HNO_3$ | 20 |
| $C_2H_4O_2$ + HCl, $HNO_3$ or $H_2SO_4$ | 70 |

EXAMPLE 5

Figure 2:
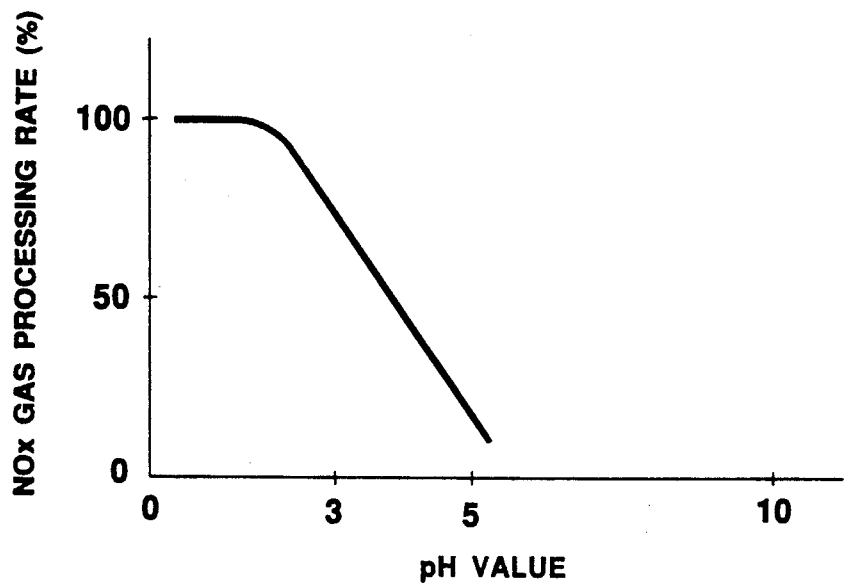
FIG. 2 is a graph showing a relationship between $NO_x$ gas processing rate and pH value.

In EXAMPLE 5, the process of EXAMPLE 3 was performed with various values of the acidity (pH) of the $NaN_3/H_2SO_4$ solution, so that a $NO_x$ gas processing rate (%) versus acidity (pH) relationship was obtained as shown in FIG. 2. As seen from FIG. 2, the $NO_x$ gas processing rate is significantly lowered when the pH becomes less than about 3.

EXAMPLE 6

At first, 6.5 g of $KN_3$ was dissolved in 1000 millimeters of water, and a few drops of HCl were added to the solution to provide the pH less than 3. Subsequently, this solution was introduced into the reaction case 2 through the conduit 6.

Subsequently, exhaust gas containing 1000 p.p.m. of $NO_x$ was mixed with air so as to dilute the exhaust gas to provide a gas mixture containing 500 p.p.m. of $NO_x$. This gas mixture was then introduced into the solution so as to react the gas mixture with $KN_3$.

Subsequently, the produced gas was measured by the same $NO_x$ concentration measuring apparatus 22 as in EXAMPLE 1.

TABLE 6 shows results of this measurement. As shown in TABLE 6, the diluted $NO_x$ concentration of 500 p.p.m. was decreased to 50 p.p.m. by reacting the gas mixture with the $KN_3$ solution.

TABLE 6

| CONDITION | $NO_x$ CONCENTRATION (p.p.m.) BEFORE PROCESSING | $NO_x$ CONCENTRATION (p.p.m.) AFTER PROCESSING |
|---|---|---|
| NOT TREATED | 1000 | — |
| AIR | 1000 | 500 |
| $KN_3/H_2O$ + HCl | 500 | 50 |

EXAMPLE 7

In EXAMPLE 7, various kinds of azide compounds as listed in TABLE 7 were used in place of $KN_3$. The other conditions were the same as those of EXAMPLE 6.

As seen from TABLE 7, the same or similar effects as in EXAMPLE 6 were attained.

TABLE 7

| KIND OF AZIDE | $NO_x$ CONCENTRATION (p.p.m) AFTER PROCESSING |
|---|---|
| $NH_4N_3$ | 50 |
| $Cd(N_3)_2$ | 40 |
| $Ca(N_3)_2$ | 40 |
| $Co(N_3)_2$ | 40 |
| $Sr(N_3)_2$ | 40 |
| $CsN_3$ | 50 |
| $Ba(N_3)_2$ | 40 |
| $IN_3$ | 50 |
| $LiN_3$ | 50 |
| $RbN_3$ | 50 |

Now, a second preferred embodiment will be described hereinbelow. The apparatus as shown in FIG. 1 is also used in the second preferred embodiment.

In the second preferred embodiment, hydrogen azide ($HN_3$) is obtained separately outside the reaction case 2 and dissolved in water. This solution is introduced into the reaction case 2 through the conduit 6 for subsequent processing of the $NO_x$ gas. Accordingly, preparation of the $HN_3$ solution is more easily and conveniently performed than in the first preferred embodiment.

EXAMPLE 8

At first, 10 millimeters of $HN_3$ was obtained according to the following formula:

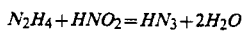

$$N_2H_4 + HNO_2 = HN_3 + 2H_2O$$

Subsequently, 10 millimeters of $HN_3$ was dissolved in 200 millimeters of water, and this solution was introduced into the reaction case 2 through the conduit 6.

Subsequently, a gas mixture of 3 liters per minute of exhaust gas containing 1000 p.p.m. of $NO_x$ and 1 liters per minute of oxygen was introduced into the solution so as to react the gas mixture with $HN_3$.

Subsequently, the produced gas was measured by the same $NO_x$ concentration measuring apparatus 22 as in EXAMPLE 1.

TABLE 8 shows results of this measurement. As shown in TABLE 8, the exhaust gas including 1000 p.p.m. of $NO_x$ was diluted by mixing with oxygen to show 500 p.p.m. of $NO_x$. Further, $NO_x$ concentration was reduced to 50 p.p.m. of $NO_x$ by reacting the gas mixture with the $HN_3$ solution. This reduced $NO_x$ concentration was equal to that obtained by using $NaN_3$/HCl solution under the same conditions, which is also shown in TABLE 8.

TABLE 8

| CONDITION | $NO_x$ CONCENTRATION (p.p.m.) BEFORE PROCESSING | $NO_x$ CONCENTRATION (p.p.m.) AFTER PROCESSING |
| --- | --- | --- |
| NOT TREATED | 1000 | — |
| OXYGEN | 1000 | 500 |
| $HN_3/H_2O$ | 500 | 50 |
| $NaN_3/H_2O$ + HCl | 500 | 50 |

TABLE 9

| CONDITION | $NO_x$ CONCENTRATION (p.p.m.) BEFORE PROCESSING | $NO_x$ CONCENTRATION (p.p.m.) AFTER PROCESSING |
| --- | --- | --- |
| NOT TREATED | 920 | — |
| AIR + $H_2O$ ATOMIZATION | 920 | 400 |
| $NaN_3/H_2O$ + HCl PLASMA | 400 | 15 |

Figure 3:
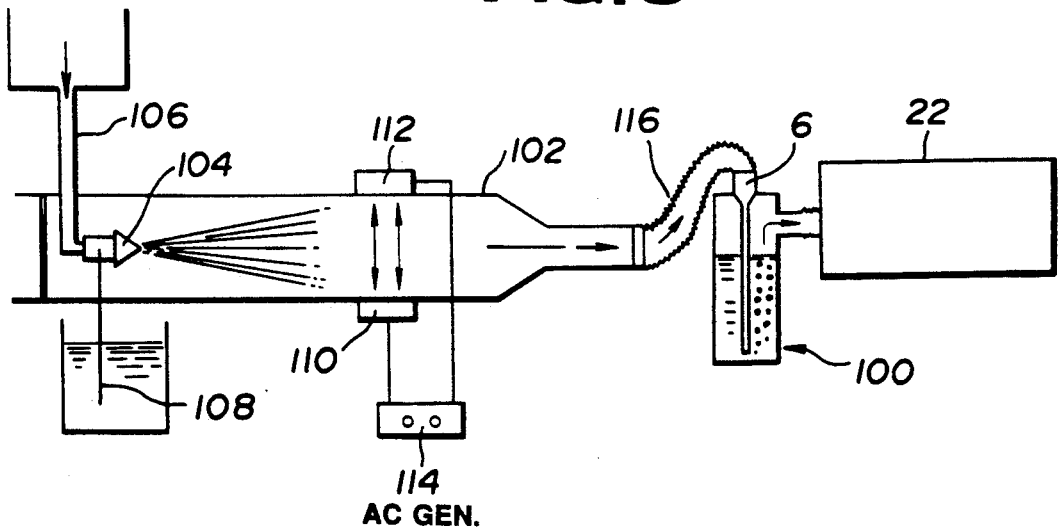
FIG. 3 is a schematic view showing an apparatus for processing nitrogen oxide, to be used in a third preferred embodiment of the present invention.

FIG. 3 shows an apparatus for processing the $NO_x$ gas so as to decompose $NO_x$ to $N_2$ and $H_2O$, to be used in a third preferred embodiment of the present invention.

In FIG. 3, the same or similar parts or members are designated by the same reference numerals as in FIG. 1 to avoid redundant explanation thereof. It is to be appreciated that an apparatus generally designated by a reference numeral 100 has the same structure as that shown in FIG. 1. In a casing 102 preferably made of quartz, a spray nozzle 104 is provided for mixing water supplied through a conduit 108 with a gas mixture of exhaust gas and oxygen and air supplied through a conduit 106, into the casing 102 to form wet gas. On an outer periphery of the casing 102, electrodes 110 and 112 are fixedly provided which are respectively connected to a high frequency AC power supply 114 for generating discharge therebetween so as to feed plasma into the wet gas. As long as plasma can be produced, other suitable means may be employed for generating plasma in the casing 102. This plasmatically activated wet gas is then introduced into the apparatus 100 through a conduit 116. The introduced wet gas is processed in the apparatus 100 in the same manner as in the first and second preferred embodiments.

In the third preferred embodiment, as the wet gas is activated by plasma, the subsequent reaction with hydrogen azide is advanced with higher efficiency. Further, since the exhaust gas is introduced into the $HN_3$ solution after the plasmatic processing has been effected, consumption of $HN_3$ in the solution is lower in comparison with that of non-processed exhaust gas being directly introduced into the $HN_3$ solution.

EXAMPLE 9

At first, a gas mixture of 3 liters per minute of exhaust gas containing 920 p.p.m. of $No_x$ and 3 liters per minute of air as well as water were made to mist through the spray nozzle 104 into the casing 102 to form a wet gas.

Subsequently, the wet gas was formed into plasma which is generated by discharge between the electrodes 110 and 112 using a frequency of 13.56 MHz fed by the high frequency AC power supply 114.

This wet gas activated was then introduced into the apparatus 100 through the conduit 116 to process the activated wet gas in the same manner as in EXAMPLE 1.

TABLE 9 shows results of the measurement of $NO_x$ gas concentration contained in the processed gas. As seen from TABLE 9, $NO_x$ concentration was reduced to 15 p.p.m. which is 35 p.p.m. less than that obtained in EXAMPLE 1 and even 10 p.p.m. less than that obtained in EXAMPLE 2.

EXAMPLE 10

In EXAMPLE 10, oxygen was used in place of air. The other conditions were the same as those of EXAMPLE 9.

TABLE 10 shows results of the measurement of $NO_x$ gas concentration contained in the processed gas. As seen from TABLE 10, $NO_x$ concentration was reduced to 5 p.p.m. which is 20 p.p.m. less than that obtained in EXAMPLE 2 and even 10 p.p.m. less than that obtained in EXAMPLE 9.

TABLE 10

| CONDITION | $NO_x$ CONCENTRATION (p.p.m.) BEFORE PROCESSING | $NO_x$ CONCENTRATION (p.p.m.) AFTER PROCESSING |
| --- | --- | --- |
| NOT TREATED | 920 | — |
| $O_2$ + $H_2O$ ATOMIZATION | 920 | 400 |
| $NaN_3/H_2O$ + HCl PLASMA | 400 | 5 |

Figure 4:
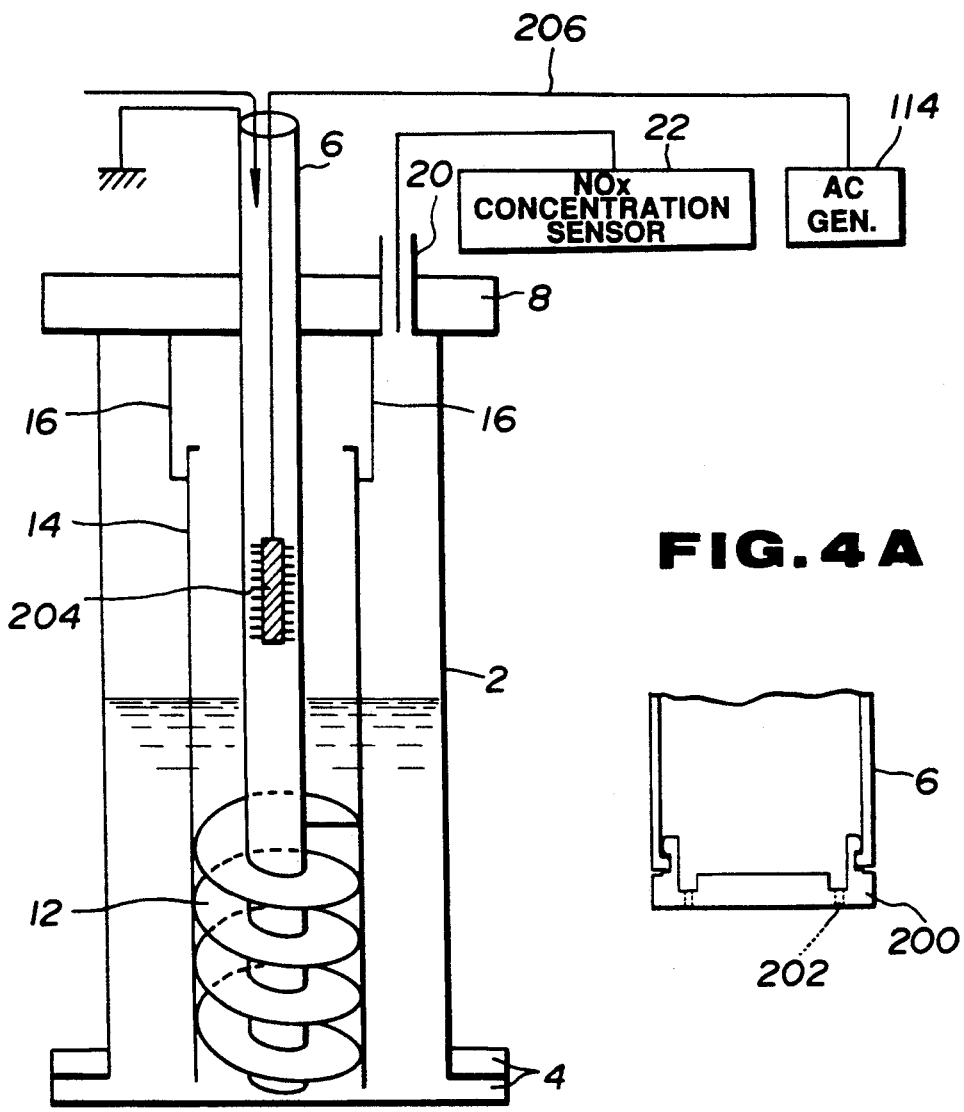

FIGS. 4 and 4A show a modification of the apparatus as illustrated in FIG. 3. In FIGS. 4 and 4A, the same or similar parts or members are designated by the same reference numerals as in FIGS. 1 and 3 to avoid redundant explanation thereof.

In FIGS. 4 and 4A, a gas mixture discharging member 200 is detachably fixed to the bottom of the conduit 6. The discharging member 200 has a plurality of holes 202 through which the gas mixture is introduced into the reaction case 2. Since the discharging member 200 is detachable, a supply amount of the gas mixture can be controlled by replacing the discharging member 200 with another having holes 200 of a different diameter. Further, the helical vane 12 is arranged in slidable contact with the auxiliary reaction case 14 so as to increase agitation efficiency within the auxiliary reaction case 14. Accordingly, the auxiliary reaction case 14 is preferably made of glass to provide smoother slidability for the rotating helical vane 12.

In the conduit 6, an electrode 204 is suspended just above a level of the $HN_3$ solution in the reaction case 2. The electrode 204 is connected to the high frequency AC power supply 114 through a cable 206, and the conduit 6 made of conductive material, i.e. metals, such as, a stainless steel which serves as another electrode, is connected to ground. Discharge is generated between the electrode 204 and the conduit 6 to feed plasma into the gas mixture so as to activate same for allowing the subsequent reaction with the $HN_3$ solution highly effective. The electrode 204 is of a stylus type having a plurality of metal styli for providing a better plasma condition in the conduit 6.

In the apparatus as shown in FIGS. 4 and 4A, because plasma is generated directly within the conduit 6, the gas mixture is reacted with the $HN_3$ solution under more activated condition, hence, the apparatus itself can be made compact and smaller.

It is to be appreciated that the gas mixture may be introduced into the conduit 6 either in the form of the atomized wet gas as in FIG. 3, or without any processing as in FIG. 1.

Figure 5:
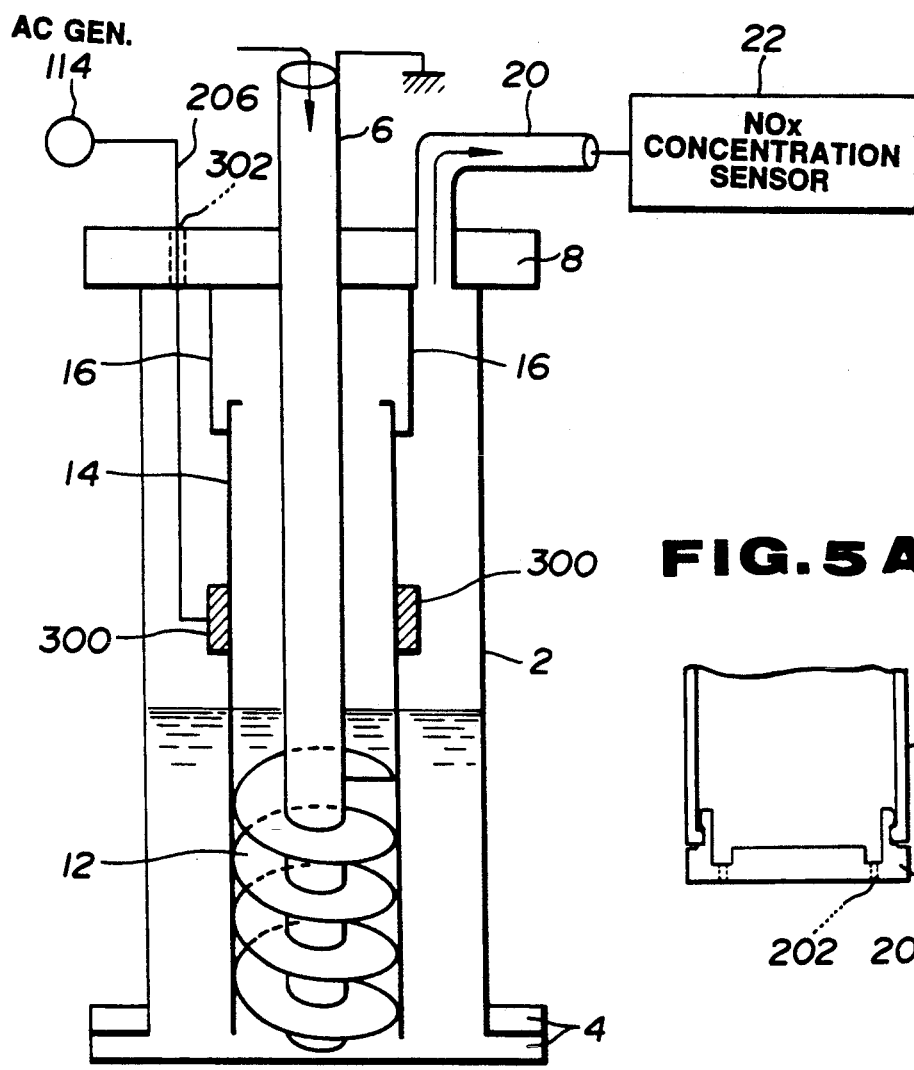
FIGS. 5 and 5A are a schematic view showing a modification of the apparatus of FIGS. 4 and 4A.
Figure 5A:
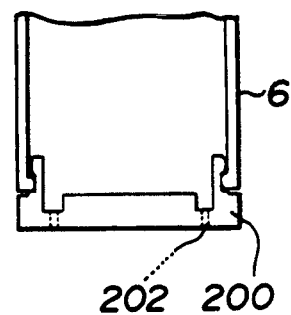

FIGS. 5 and 5A show a modification of the apparatus as illustrated in FIGS. 4 and 4A. In FIGS. 5 and 5A, the same or similar parts or members are designated by the same reference numerals as in FIGS. 4 and 4A to avoid redundant explanation thereof.

In FIGS. 5 and 5A, an annular electrode 300 is fixed to an outer periphery of the auxiliary reaction case 14 just above the level of the $HN_3$ solution for generating plasma between the auxiliary reaction case 14 and the conduit 6. The electrode 300 is connected to the high frequency AC power supply 114 through the cable 206 which extends through a passage 302 formed through the upper closure 8, and the conduit 6 is connected to ground for allowing plasma to flow out.

In operation, the gas mixture is directly introduced into the $HN_3$ solution through the holes 202 of the discharging member 200, and subsequently, the $HN_3$ solution and the introduced gas mixture are agitated or given swirl by the rotating helical vane 12 such that the level of the agitated $HN_3$ solution goes up above the position of the annular electrode 300. Accordingly, plasma is fed into the gas mixture in the $HN_3$ solution to be highly activated to provide highly effective reaction between the gas mixture and the $HN_3$ solution.

Figure 6:
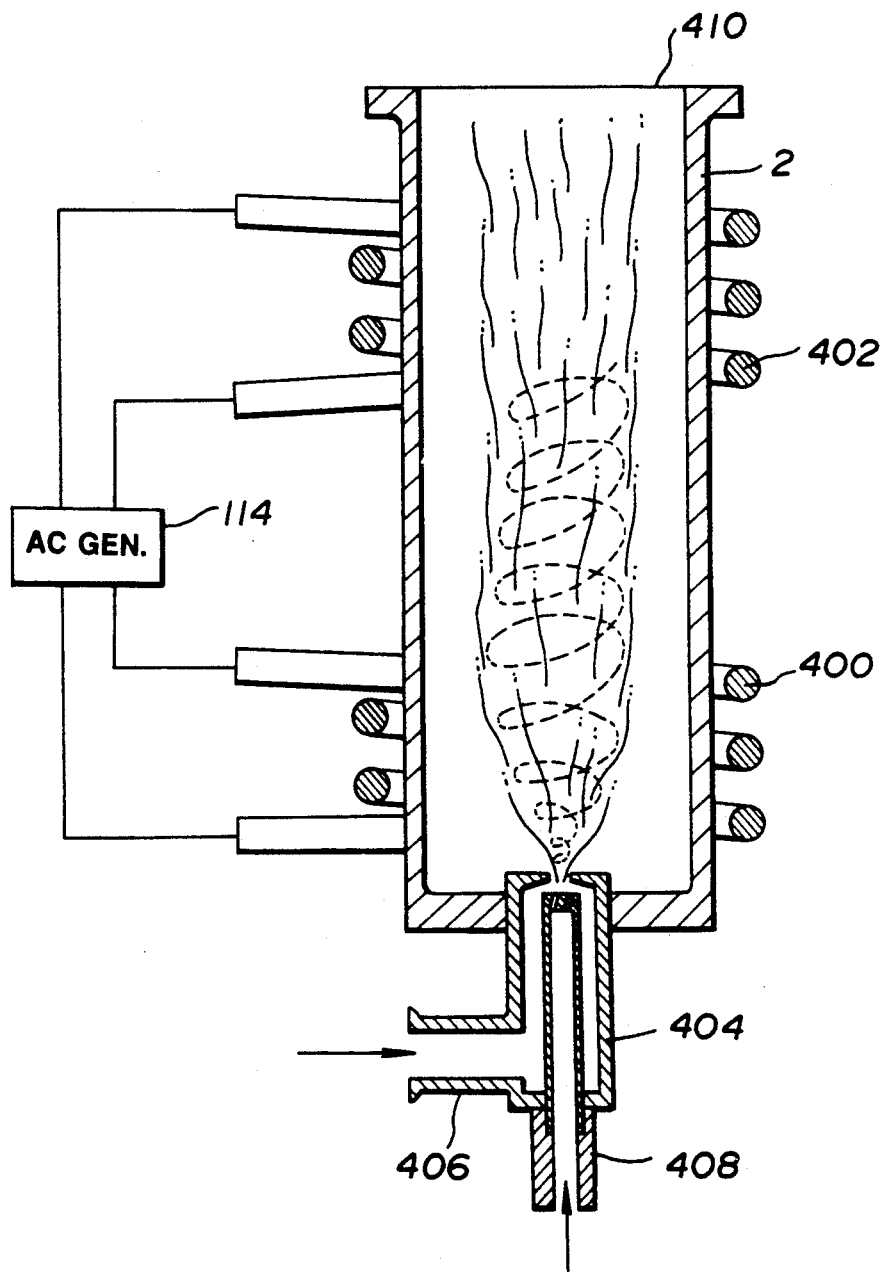
FIG. 6 are schematic views showing a modification of the apparatus of FIG. 3.

FIG. 6 shows a further modification of the apparatus as shown in FIG. 3. In FIG. 6, the same or similar parts or members are designated by the same reference numerals as in FIGS. 3 and 4 to avoid redundant explanation thereof.

In FIG. 6, a pair of coils 400 and 402 are respectively wound onto an outer periphery of the reaction case 2. Each coil is connected to the high frequency AC power supply 114 for generating plasma within the reaction case 2. The exhaust gas including $NO_x$ is introduced into a spray unit 404 through the conduit 406. Further, the $HN_3$ solution prepared as in the first or second preferred embodiment is introduced into the spray unit 404. The $HN_3$ solution is made to mist with the exhaust gas into the reaction case 2 to form wet gas. The introduced wet gas is then formed into plasma to be highly activated for allowing the reactions represented by the foregoing reaction formulae (1) and (2) to be highly advanced in the reaction case 2. The processed gas is then discharged through an outlet 410.

It is to be appreciated that the exhaust gas may be mixed with one of oxygen and air before being introduced into the spray unit 404. In this case, the reactions represented by the reaction formulae (1) and (2) are more highly and more rapidly proceeded.

Figure 7:
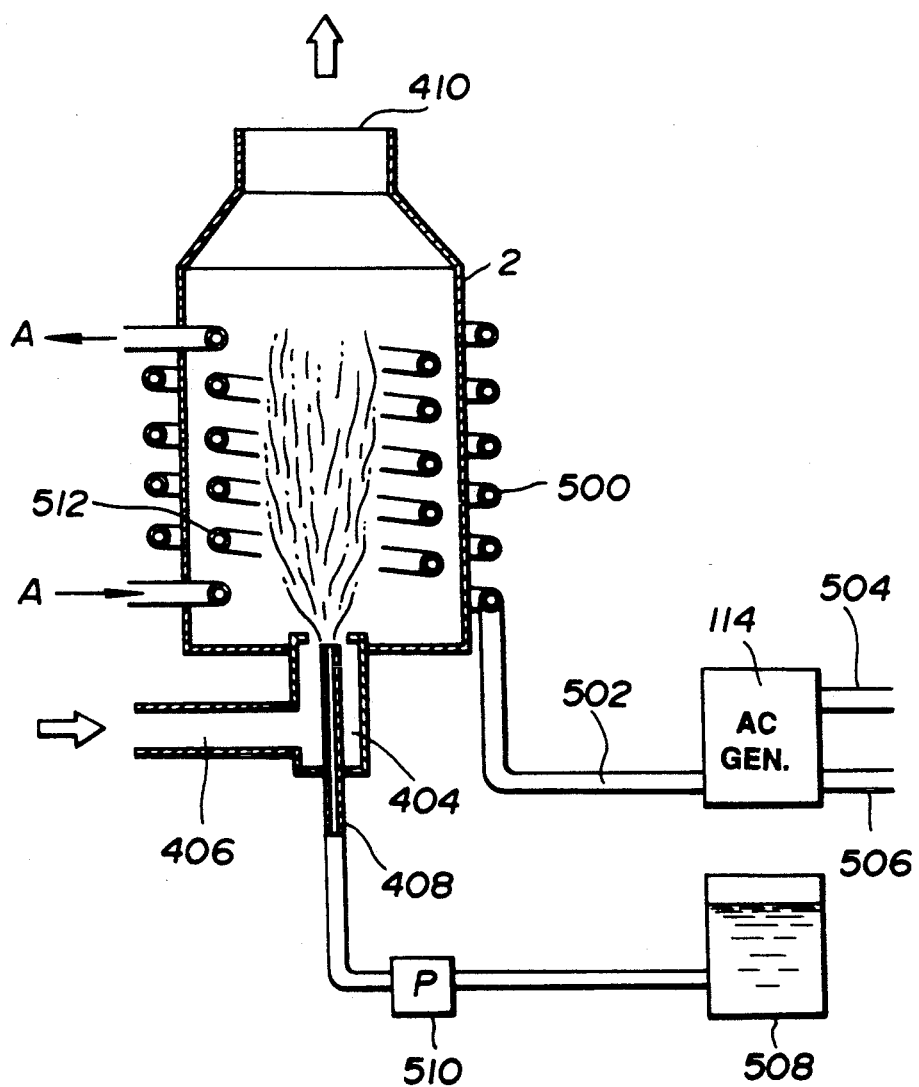
FIG. 7 is a schematic view showing a modification of the apparatus of FIG. 6.

FIG. 7 shows a modification of the apparatus as shown in FIG. 6. In FIG. 7, the same or similar parts or members are designated by the same reference numerals as in FIG. 6 to avoid redundant explanation thereof.

In FIG. 7, a coil 500 is wound onto the outer periphery of the reaction case 2. The coil 500 is connected to the high frequency AC power supply 114 through a cable 502 for generating plasma within the reaction case 2. A reference numeral 504 designates a power supply cable for the high frequency AC power supply 114, and a reference numeral 506 designates a cooling water pipe for cooling the high frequency AC power supply 114.

The $HN_3$ solution prepared as in the first or second preferred embodiment is stored in a tank 508, which is sucked by a pump 510 to be introduced into the spray unit 404 through the conduit 408. Further, the exhaust gas is introduced into the spray unit 404 through the conduit 406 for misting the $HN_3$ solution into the exhaust gas to form wet gas, which is then fed into the reaction case 2. The introduced wet gas is then fed with plasma and processed as in FIG. 6.

In the reaction case 2, a heat recovery pipe 512 of a coil shape is fixedly arranged. As indicated by arrows A—A, water is supplied into the heat recovery pipe 512 and serves as heat-exchanger medium for recovering the heat generated by the electric discharge in the form of boiling water or steam. This recovered heat can be used, such as, for the thermoelectric generator which is combined to the apparatus of FIG. 7. Further, it may be possible to supply water into the coil 500 for recovering the heat generated at the coil 500. Still further, it may also be possible to provide the coil 500 in the reaction case 2.

Figure 8:
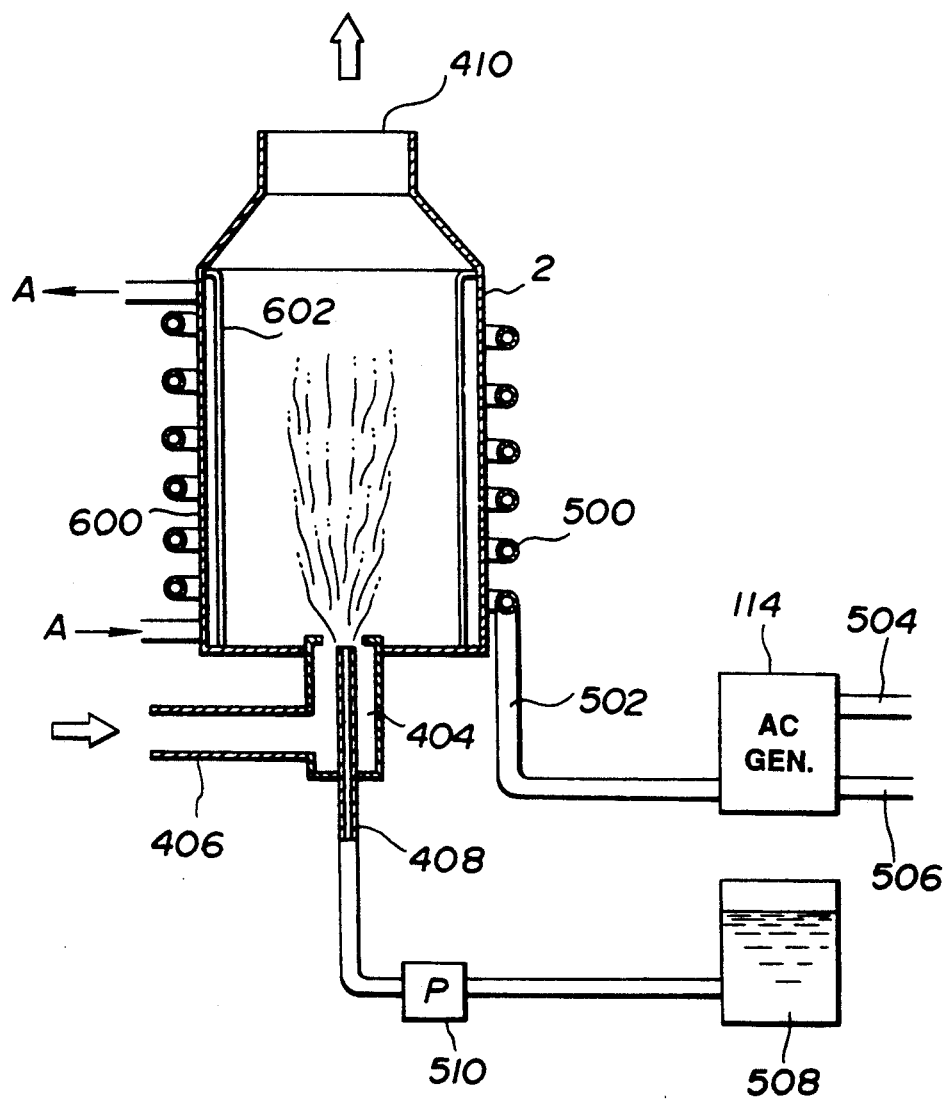
FIG. 8 is a schematic view showing a modification of the apparatus of FIG. 7.

FIG. 8 shows a modification of the apparatus as shown in FIG. 7. In FIG. 8, the same or similar parts or members are designated by the same reference numerals to avoid redundant explanation thereof.

In FIG. 8, in place of the coil-shaped heat recovery pipe 512 in FIG. 7, an annular space 600 is provided between a side wall of the reaction case 2 and a partition 602. Water, serving as the heat-exchanger medium, is supplied into the annular space 600 for recovering the heat as in FIG. 7.

The reaction case 2 of FIG. 8 can be made smaller in size in comparison with that of FIG. 7.

It is to be understood that the invention is not to be limited to the embodiments described above, and that various changes and modifications may be made without departing from the spirit and scope of the invention as defined in the appended claims.

We claim:

1. A method for processing nitrogen oxide, comprising the steps of:
    dissolving azide in water under acid conditions to form an aqueous solution containing hydrogen azide;
    forming a gas mixture of (a) nitrogen oxide containing gas and (b) oxygen and air;
    introducing said gas mixture into said aqueous solution to react said nitrogen oxide with said hydrogen azide to reduce said nitrogen oxide.

2. A method as set forth in claim 1, which further comprises the step of:
    feeding plasma into said gas mixture before introducing said gas mixture into said aqueous solution.

3. A method as set forth in claim 1, which further comprises the step of:
    feeding plasma into said gas mixture after said gas mixture is introduced into said aqueous solution.

4. A method as set forth in claim 3, wherein plasma is fed into said gas mixture by applying electric energy to said aqueous solution after said gas mixture is introduced into said aqueous solution.

5. A method as set forth in claim 1, which further comprises the step of:
    giving swirl to said gas mixture and said aqueous solution after said gas mixture is introduced into said aqueous solution.

6. A method as set forth in claim 2, which further comprises the step of:

giving swirl to said gas mixture and said aqueous solution after said gas mixture is introduced into said aqueous solution.

7. A method as set forth in claim 3, which further comprises the step of:
giving swirl to said gas mixture and said aqueous solution after said gas mixture is introduced into said aqueous solution and before plasma is fed into said gas mixture.

8. A method as set forth in claim 1, wherein said gas mixture is mixed with water to form wet gas, the wet gas being introduced into said aqueous solution.

9. A method as set forth in claim 8, wherein plasma is fed into said wet gas before said wet gas is introduced into said aqueous solution.

10. A method as set forth in claim 1, wherein said azide is a compound formed from $N_3^-$ ion and one selected from the group consisting of nitrogen trioxide, carbon monoxide, iodine and metals which belong to the 3rd to 6th periods of the groups 1A and 2A in the periodic table.

11. A method as set forth in claim 10, wherein said azide is used in a manner selected from the group consisting of alone and in combination with one or more of the other azides.

12. A method as set forth in claim 1, wherein said acid condition is provided by using an acid selected from the group consisting of hydrochloric acid, sulfuric acid and nitric acid.

13. A method as set forth in claim 12, wherein said acid is used in a manner selected from the group consisting of alone, in combination with one or more of other acids and in combination with acetic acid.

14. A method as set forth in claim 1, wherein acidity of said acid condition is less than 3 pH.

15. A method for processing nitrogen oxide, comprising the steps of:
dissolving azide in water under acid conditions to form an aqueous solution containing hydrogen azide;
introducing a nitrogen oxide containing gas into said aqueous solution to form a gas mixture with a mist of said aqueous solution;
feeding plasma into said gas mixture with mist of said aqueous solution to accelerate reaction between said nitrogen oxide and said hydrogen azide to reduce said nitrogen oxide.

16. A method as set forth in claim 15, which further comprises the step of:
mixing said nitrogen oxide containing gas with a gas of oxygen or air before introducing said nitrogen oxide containing gas into said aqueous solution.

17. A method for processing nitrogen oxide, comprising the steps of:
dissolving sodium azide in water under acid conditions to form an aqueous solution containing hydrogen azide;
forming a gas mixture of (a) nitrogen oxide containing gas and (b) oxygen and air;
introducing said gas mixture into said aqueous solution to react said nitrogen oxide with said hydrogen azide to reduce said nitrogen oxide.

* * * * *